(12) United States Patent
Todd

(10) Patent No.: US 12,032,696 B2
(45) Date of Patent: Jul. 9, 2024

(54) CONFIDENCE-ENABLED DATA STORAGE SYSTEMS

(71) Applicant: EMC IP Holding Company LLC, Hopkinton, MA (US)

(72) Inventor: Stephen J. Todd, North Andover, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 930 days.

(21) Appl. No.: 17/038,741

(22) Filed: Sep. 30, 2020

(65) Prior Publication Data

US 2022/0100858 A1   Mar. 31, 2022

(51) Int. Cl.
| | |
|---|---|
| G06F 21/57 | (2013.01) |
| G06F 16/14 | (2019.01) |
| G06F 16/16 | (2019.01) |
| G06F 16/17 | (2019.01) |
| G06F 16/182 | (2019.01) |

(52) U.S. Cl.
CPC ............ *G06F 21/57* (2013.01); *G06F 16/148* (2019.01); *G06F 16/164* (2019.01); *G06F 16/1734* (2019.01); *G06F 16/1824* (2019.01)

(58) Field of Classification Search
CPC ...... G06F 21/57; G06F 16/148; G06F 16/164; G06F 16/1734; G06F 16/1824; G06F 21/64
See application file for complete search history.

(56) References Cited

U.S. PATENT DOCUMENTS

| | | | | |
|---|---|---|---|---|
| 6,519,603 | B1 * | 2/2003 | Bays | G06F 40/169 |
| | | | | 707/999.102 |
| 2002/0049738 | A1 * | 4/2002 | Epstein | G06F 16/951 |
| 2005/0165852 | A1 * | 7/2005 | Albornoz | G06F 16/907 |
| 2005/0193179 | A1 * | 9/2005 | Cochran | G06F 11/2074 |
| | | | | 714/E11.107 |
| 2005/0216454 | A1 * | 9/2005 | Diab | G06F 16/951 |
| 2006/0294085 | A1 * | 12/2006 | Rose | G06F 16/24578 |
| | | | | 707/E17.084 |
| 2011/0154178 | A1 * | 6/2011 | Cragun | G06F 40/169 |
| | | | | 715/230 |
| 2015/0074078 | A1 * | 3/2015 | Roche | G06F 16/951 |
| | | | | 707/754 |
| 2016/0275417 | A1 * | 9/2016 | Welinder | G06N 20/00 |
| 2017/0303014 | A1 * | 10/2017 | Ghessassi | H04Q 9/00 |

OTHER PUBLICATIONS

Chen et al., "Explicit Data Correlations-Directed Metadata Prefetching Method in Distributed File Systems", Jun. 2019, IEEE Transactions on Parallel and Distributed Systems, vol. 30, No. 12, pp. 2692-2705 (Year: 2019).*

* cited by examiner

*Primary Examiner* — Kenneth W Chang
(74) *Attorney, Agent, or Firm* — Workman Nydegger

(57) ABSTRACT

One example method includes receiving data from a node of a data confidence fabric, in response to receipt of the data, creating an annotation bookmark that (i) identifies a storage node at which the data was received and that (ii) uniquely identifies the data, annotating a copy of the data with the annotation bookmark, and storing, at the storage node, the copy of the data in association with the annotation bookmark.

18 Claims, 11 Drawing Sheets

CONFIDENCE-ENABLED DATA STORAGE SYSTEMS

FIELD OF THE INVENTION

Embodiments of the present invention generally relate to data confidence methods and systems. More particularly, at least some embodiments of the invention relate to systems, hardware, software, computer-readable media, and methods for implementing data confidence in data storage systems.

BACKGROUND

A Data Confidence Fabric (DCF) may annotate trust operations as data flows through the fabric, resulting in a confidence score derived from the annotations. When a storage system persists this data, however, the storage system is unaware of any confidence information associated with the data. Similarly, when an application retrieves data from a storage system, the application is unaware of confidence information associated with the data.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
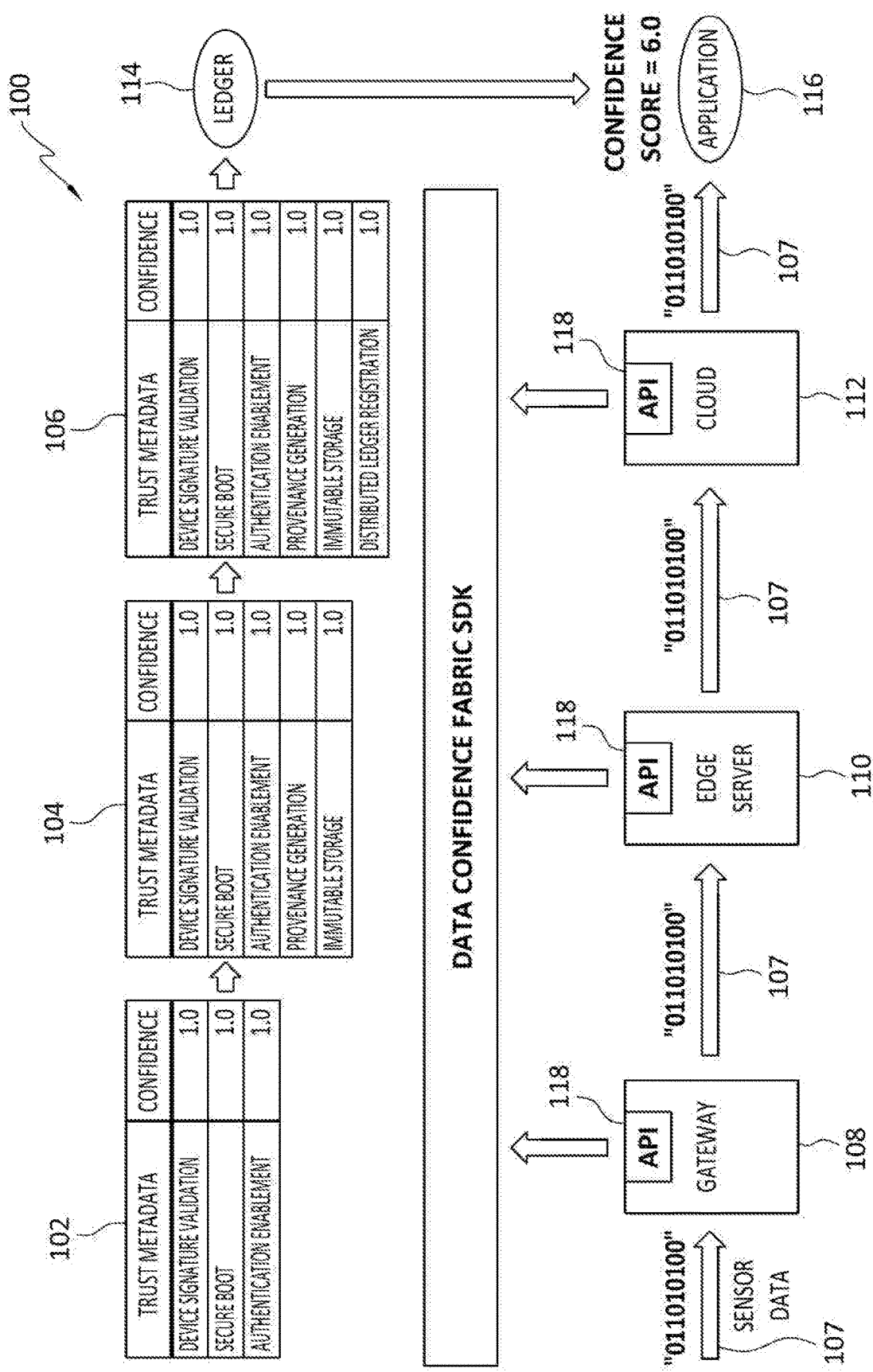
FIG. 1 discloses the annotation/scoring of data flowing through a data confidence fabric.

Embodiments of the present invention generally relate to data confidence methods and systems. More particularly, at least some embodiments of the invention relate to systems, hardware, software, computer-readable media, and methods for implementing data confidence in data storage systems.

In general, example embodiments of the invention may employ the concept of an annotation bookmark to notify a confidence assessor that a confidence-aware data storage system needs updating. In one example embodiment, a confidence-aware storage system may annotate DCF (data confidence fabric) metadata with an annotation bookmark. The annotation bookmark may instruct business logic, such as an assessor for example, that a confidence-aware storage system was involved in a DCF operation and would like acknowledgement of final confidence calculations performed by the assessor. In this way, confidence scores may be assigned to data stored in the confidence-aware data storage system. Both the storage system, and entities, such as applications for example, that access data stored in the storage system, may thus be aware of confidence information associated with the stored data.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that applications, for example, may have an awareness as to the relative confidence that has been assigned to data that is needed by the application. As another example, an embodiment may provide insights to a storage system administrator as to the confidence level associated with the stored data, thus enabling the storage administrator to make decisions about, for example, data management policies involving the storage system.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, operations including but not limited to, data confidence assessment and assignment operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Overview

With particular attention now to FIG. 1, one example of an operating environment for embodiments of the invention is denoted generally at 100 and comprises a DCF. The DCF 100 may comprise various elements, each of which may assign particular trust metadata, such as in the form of confidence scores for example, to data passing through the DCF. The assigned trust metadata may be specific to respective assessments made by each of the elements concerning the data. The trust metadata may be appended by each element as the data passes through the DCF, such that when the data has transited the DCF, and is accessed, or is accessible by, an application, respective trust metadata assigned by one or more of the elements has been associated with the data. The trust metadata may then be accessed by the application or other end user of the data.

In the particular illustrative example of FIG. 1, respective trust metadata 102, 104 and 106, may be assigned by various entities of the DCF 100 to data 107, such as may be generated by one or more sensors or other devices, flowing through the DCF 100. As used herein, a 'sensor' is broad in scope and may embrace, but is not limited to, any device, system, and/or software, operable to detect environmental parameters including, but not limited to, light, heat, moisture, temperature, pressure, humidity, smoke, gases, sound, vibration, motion. Thus, such environmental parameters include physical parameters of a physical environment, such as a datacenter building for example, in which a computing system, device, and/or software may operate. The term 'sensor' also may embrace, but is not limited to, any device, system, and/or software, operable to detect operational parameters of any type of computing device, system, or component, where such operational parameters may include, but are not limited to, bandwidth, throughput rate, disk operation, disk RPMs, and bit error rate. Moreover, embodiments of the invention are not limited to use with IoT devices and sensors, but extend, more generally, to any system, device, hardware, and/or software.

In the example of FIG. 1, trust metadata 102 may be assigned to the data 107 by a gateway 108, and that trust metadata 102, which may comprise data confidence scores, may concern a device signature validation, security of a boot operation, and the enablement of authentication. For example, if a sensor signed the data 107, and the gateway 108 has the public key to verify the signature, the gateway 108 may annotate the successful validation and assign a confidence score of 1.0. As well, if the gateway 108 is running authentication and authorization software, the gateway 108 may be able to ensure that the data 107 stream can only be viewed by clients with the right credentials, such as an authorized account on a nearby edge server. The ability of the gateway 108 to protect the data in this way may also be annotated and scored.

An edge server 110, downstream of the gateway 108, may receive the data 107 from the gateway 108, as well as the trust metadata 102 assigned by the gateway 108. The edge server 110 may append additional trust metadata 104 to the trust metadata 102 received from the gateway 108, and such trust metadata 104 may comprise, for example, provenance metadata concerning the source of the data 107, and metadata identifying whether or not the data 107 has been stored in immutable storage. If, for example, the data 107 is determined by the edge server 110 to have been stored in immutable storage, such that the data 107 cannot have been tampered with, the edge server 110 may assign a corresponding confidence score of 1.0 to the data 107, as shown in FIG. 1. As well, if the gateway 108 was able to validate a secure boot, for example, a TPM (trusted platform module) chip confirms that firmware/OS associated with the sensor that generated the data 107 has not been tampered with, the gateway 108 may annotate that fact and assign a corresponding separate confidence core. It is noted here that, in general, a confidence score of 1.0 may indicate a highest possible level of confidence, while a confidence score of 0.0 may indicate no confidence. Thus, a range of possible confidence scores may be bounded by 0.0 on the lower end of the range, and 1.0 on the upper end of the range. Another example range that may be employed is 0 to 100. More generally, any range suitable to the circumstances at hand may be employed.

With continued reference to FIG. 1, a cloud storage site 112 may receive the data 107 and trust metadata 104 from the edge server 110. The cloud storage site 112 may assign additional trust metadata 106 to the data 107, and such trust metadata 106 may comprise, for example, metadata concerning whether or not the data 107 should be registered in a distributed ledger. The confidence score assigned to the distributed ledger metadata may be based on the confidence scores of the other 5 measures in the trust metadata 106. For example, in FIG. 1, all the confidence scores are 1.0, so there may be a high level of confidence that the data 107 is suitably reliable and safe that it can, and should, be stored in a distributed ledger.

As further indicated in the example of FIG. 1, an overall confidence score may be generated and assigned to the data 107. In some embodiments, the overall confidence score may be generated simply by summing all the confidence score values that have been assigned, resulting in an overall confidence score of 6.0 in the example of FIG. 1. The overall confidence score may be stored in a distributed ledger 114 in association with the data 107, and the confidence score information and annotations stored in the distributed ledger 114 may be accessible by an application 116 that may need access to the data 107, such as for analysis for example. In the example of FIG. 1, only the confidence scores, but not the data 107, are stored in the distributed ledger 114, although such an arrangement is not required.

As further indicated in FIG. 1, the elements such as the gateway 108, edge server 110, and cloud storage site 112, may use a respective instance of a DCF API 118 (application program interface) to annotate and score the data 107. While, as noted in the preceding discussion, the handling and storage of data 107 in along the indicated path of the DCF 100 provides some useful functionalities, some shortcomings remain. These are addressed in the following section.

C. Problems Addressed by Some Example Embodiments

Figure 2:
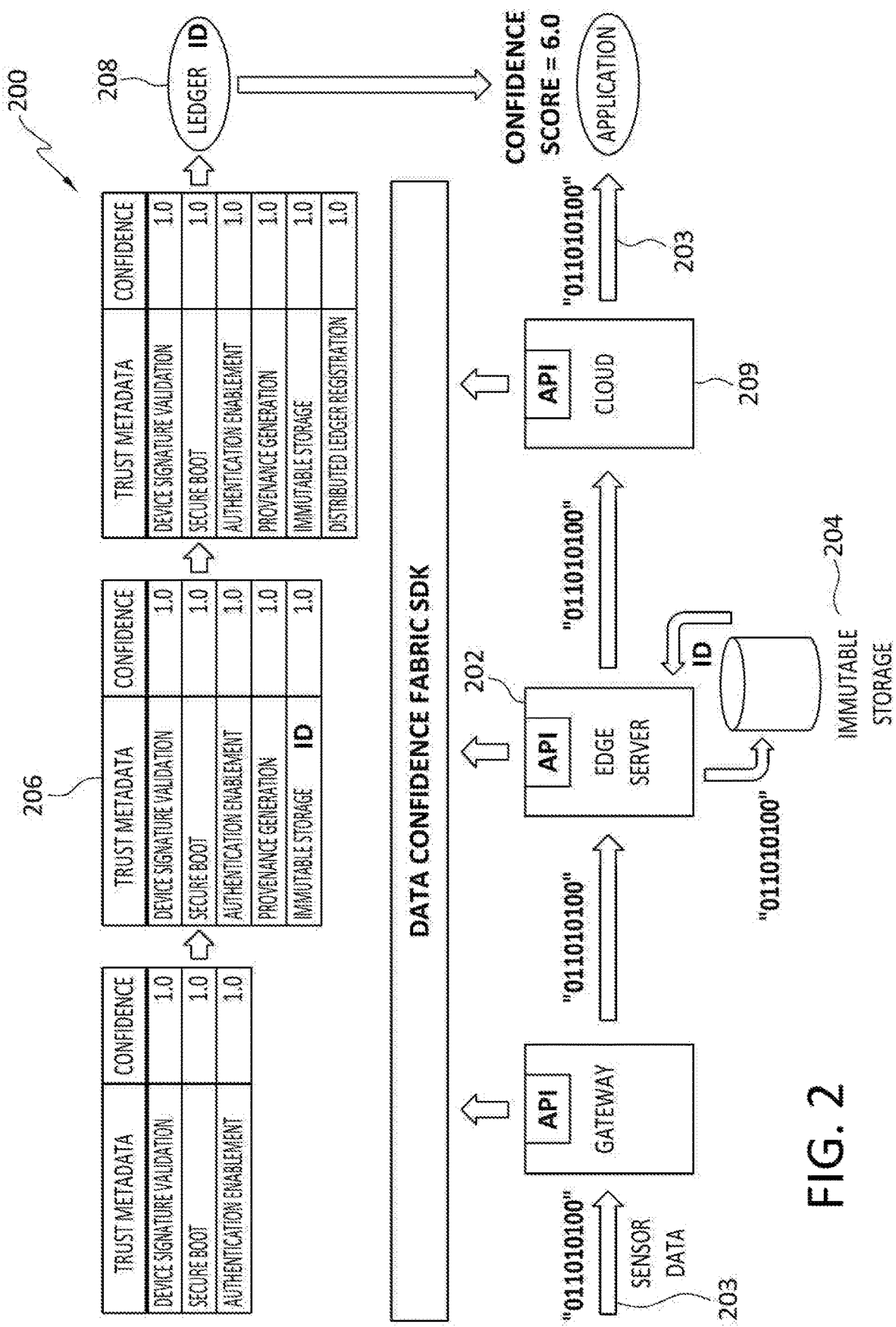
FIG. 2 discloses aspects of immutable storage during data confidence fabric operation.
Figure 3:
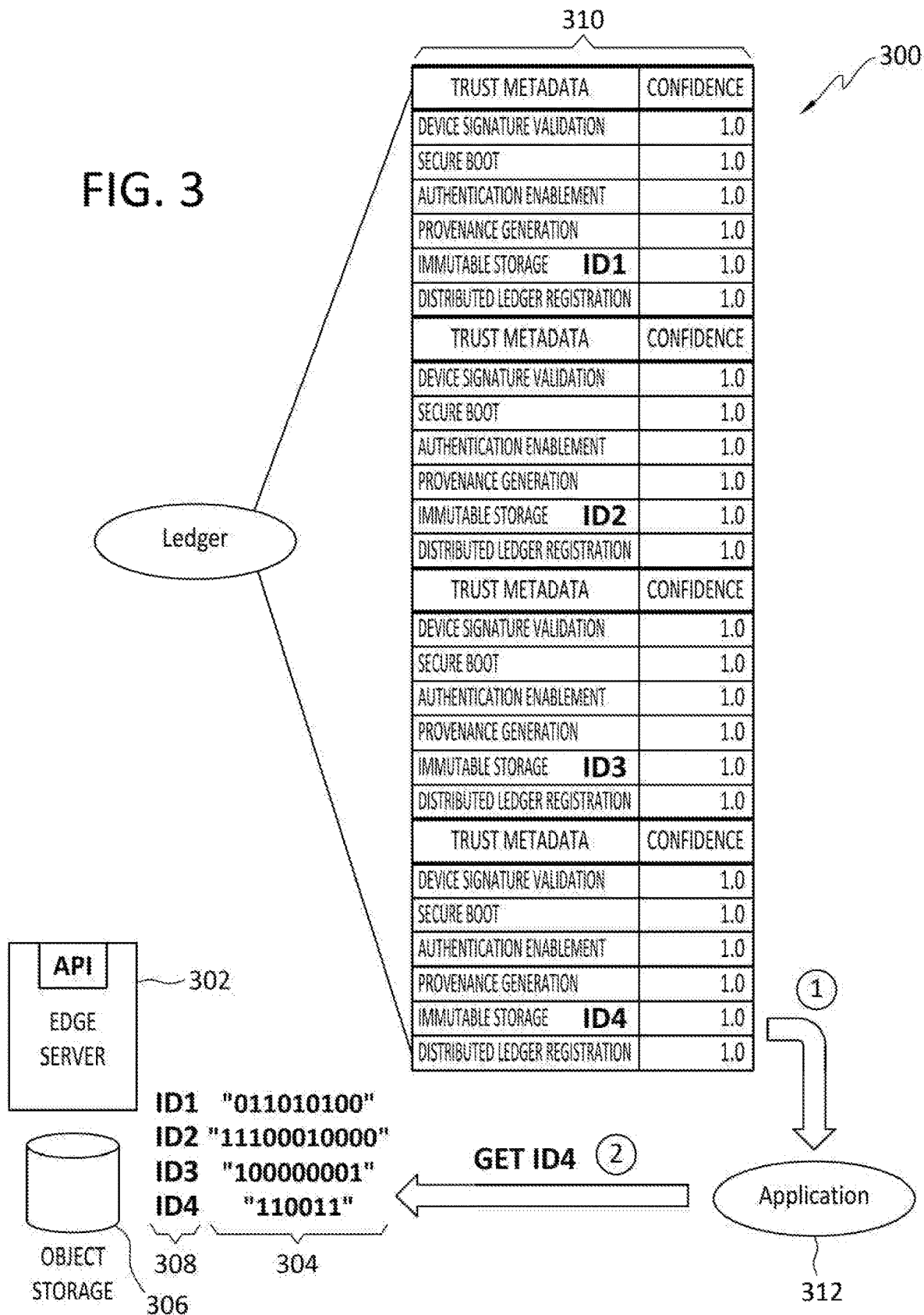
FIG. 3 discloses an example of two-phase access to DCF metadata and data.
Figure 4:
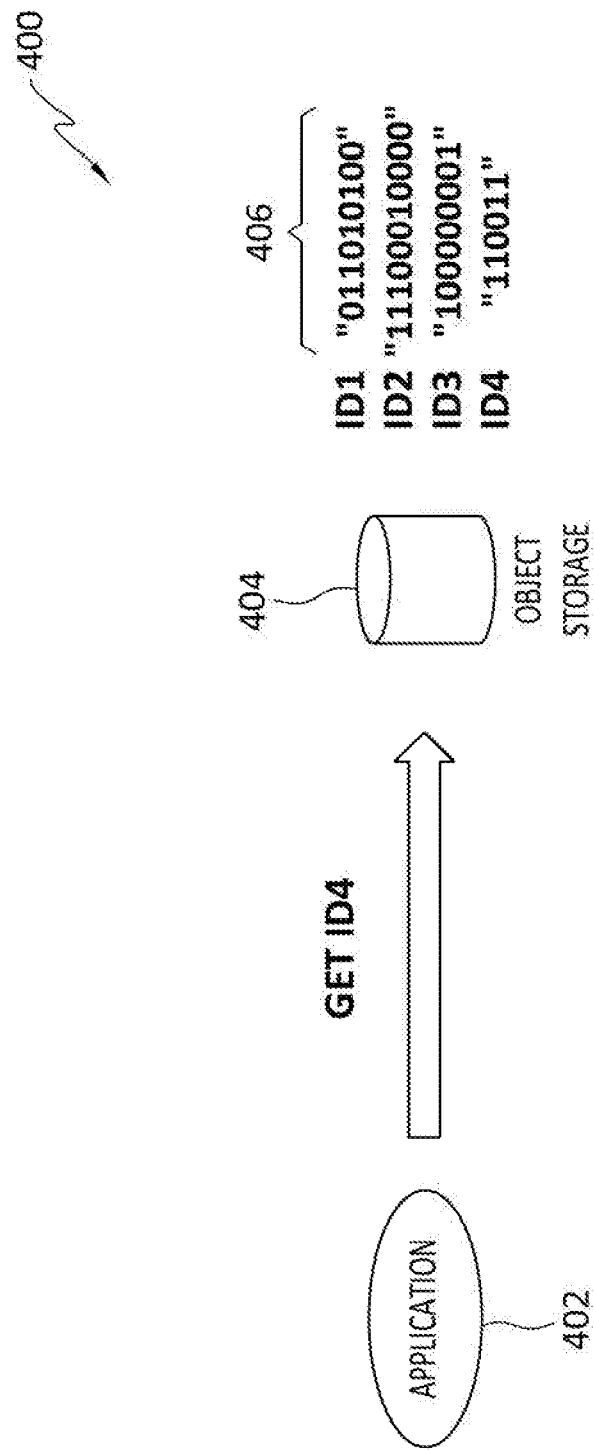
FIG. 4 discloses a configuration in which storage and an application lack DCF awareness.

With reference now to FIGS. 2-4, details are provided concerning areas where room remains for improvements in DCF structure and operation. With reference to FIG. 2 in particular, there is disclosed a DCF 200 that may be similar or identical to the DCF 100 in FIG. 1, except as noted.

In the example of FIG. 2, an edge server 202 is disclosed that may operate to persist data 203 to a local, immutable object storage system 204 which may, or may not, be part of the edge server 202. The successful storage of this data 203 may result in an annotation that "Immutable Storage" of the data 203 stream has successfully occurred, as indicated in the trust metadata 206. Particularly, the object identification "ID" returned by the immutable object storage system 204 may now be included in the annotation, and the ID may ultimately flow to a distributed ledger 208, where the ID may be permanently associated with annotations and confidence scores related to the data 203. There may be various benefits to storing the data 203 and annotations and confidence scores in this way.

For example, if the data 203 has not been signed, the persistence of the data stream may provide a hash value that may be used to detect tampering or corruption that might have occurred after storing the data 203. As another example, if the data 203 has been signed, and the public key is not available to validate the signature, the hash value from the immutable object storage system 204 may be used to detect any tampering or corruption that might have occurred after storing the data 203. As well, storing the data 203 relatively close to the sensor, that is, at the immutable object storage system 204 which is in proximity to the edge server 202, may be advantageous, relative to, for example, storage of the data at an object storage system of the cloud storage site 209. In this example, storage of the data relatively close to the sensor that generated the data 203 may enable relatively faster analytic insights as applications move further out onto the edge, and closer to data sources. As a final example of some possible advantages of the configuration of FIG. 2, a reference to the object ID, when permanently bound to the data 203, may support analytic operations, audits/governance, and potential future sale of the data 203. It is noted however that while the distributed ledger 208 entry may be permanently associated with the data 203, there may, in some circumstances, be some shortcomings associated with the example flow depicted in FIG. 2. These are addressed below with reference to FIGS. 3 and 4.

In general, FIG. 3 discloses a process that may be employed by an application, for example, to access DCF metadata and the associated data. In particular, the DCF 300 of FIG. 3 may include an edge server that may operate to persist data 304 into an object storage system 306 as the data 304 passed through the DCF 300. This may result in a set 308 of object IDs (ID1-ID4) and a corresponding set 310 of ledger entries that may contain the DCF 300 metadata with embedded object information. An application 312 wishing to access the data 304, such as for analysis purposes for example, and DCF metadata contained in the ledger entries 310 together may first (1) fetch a ledger entry 310 and extract the object ID from that ledger entry 310. Then, the application 312 may then (2) fetch the object entry, corresponding to the extracted object ID, from the object storage system 306. This approach may be non-optimal, from a performance perspective.

Particularly, and with reference now to FIG. 4, a configuration 400 is disclosed in which an application 402 may access data. As shown in FIG. 4, when the application 402 directly accesses, such as from an object storage system 404 for example, data 406 that has been annotated, scored, and stored, the DCF metadata and scores may not be available to the application 402. That is, the application 402 may lose the benefit of DCF metadata when accessing the object storage system 404 directly. As a result, the application 402 may not be aware that it is accessing data 406 that may be of poor-quality, or have associated low confidence scores.

As well, FIG. 4 illustrates that not only the application 402, but also the object storage system 404, may be unaware that the data 406 contained in the object storage system 404 has trust metadata and confidence scores associated with it, since this metadata and these scores may be stored other than at the object storage system 404. Data that is stored separately from associated trust metadata and confidence scores, such as data 406, may be referred to herein as raw data. The lack of association between the data 406 and trust metadata and confidence scores may be due to a lack of a ledger entry, or the lack of awareness that a ledger entry exists. The lack of a ledger entry, or lack of awareness of its existence, may result when, for example, the data storage piece occurs first. That is, the data 406 may be stored and the trust metadata and confidence score updated and, only afterward, the ledger entry may be updated. Thus, for a period of time after the data 406 has been stored, and even if an associated pointer is stored for a ledger entry, the updated ledger entry itself may not exist yet.

As further disclosed in the example DCF 400 of FIG. 4, there may be a lack of confidence awareness at the level of the object storage system 404. That is, given that the data 406 within the object storage system 404 is unaware of its association with confidence metadata, the object storage system 404, at a high-level, may not be aware that the data 406 stored within the object storage system 404 is "confidence-enabled." It may also be the case that there are no APIs that exist to configure the object storage system 404 for such awareness. As such, application 402 may have no mechanism to discover whether the data 406 stored on the object storage system 404 is associated with data confidence metrics.

Finally, and as further disclosed in FIG. 4, the DCF 400 may lack the ability to measure object storage system 404 confidence characteristics. This lack may be a missed opportunity, at least insofar as storage system administrators, for example, may change their management policies if they were aware of the confidence metrics associated with, and therefore the value of, the data within the system. As well, data storage systems may be unable to report an "overall data confidence score" for any data associated with the system.

D. Aspects of Some Example Embodiments

Figure 5:
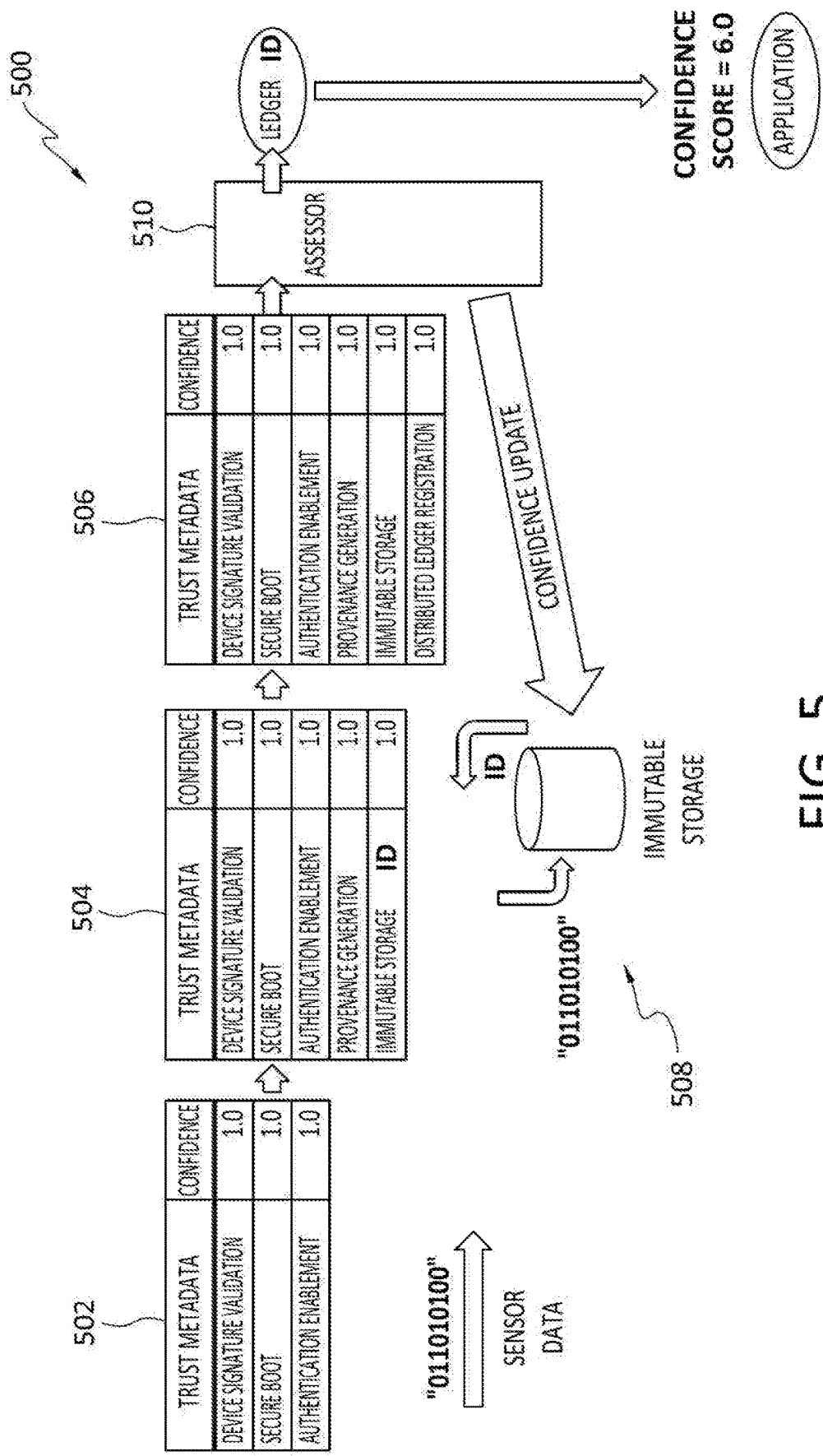
FIG. 5 discloses assessor updating of a confidence aware storage system.

With reference now to FIG. 5, details are provided concerning some further aspects of various embodiments. The configuration in FIG. 5, which may include a DCF 500, may operate similarly, or identically, to the operation of the configurations in any of FIGS. 1-3, except as noted otherwise. Thus, for example, trust metadata 502, 504, and 506 may be added to data, which may or may not be sensor data, as the data travels through the layers of the DCF 500. In the particular example of FIG. 5 however, the data may be stored in a confidence-aware data storage system 508 which may comprise, for example, an immutable storage system comprising content-addressable object storage, although that particular type of storage is not necessarily required.

With continued reference to FIG. 5, one concept implemented by at least some embodiments involves the use of an annotation bookmark to notify a confidence assessor 510 that the confidence-aware data storage system 508 needs updating. The particular example embodiment disclosed in FIG. 5 may involve the use of the confidence-aware data storage system 508 to annotate the DCF metadata 502, 504, and 506, with an annotation bookmark. This annotation bookmark may instruct business logic further down the chain, such as the confidence assessor 510, that the confidence-aware data storage system 508 was involved in a DCF operation and would like acknowledgement of final confidence calculations, for the data with which the DCF operation was concerned, from the confidence assessor 510. As indicated in FIG. 5, and discussed in further detail below, the confidence assessor 510 may provide a confidence update to the confidence-aware data storage system 508.

Figure 6:
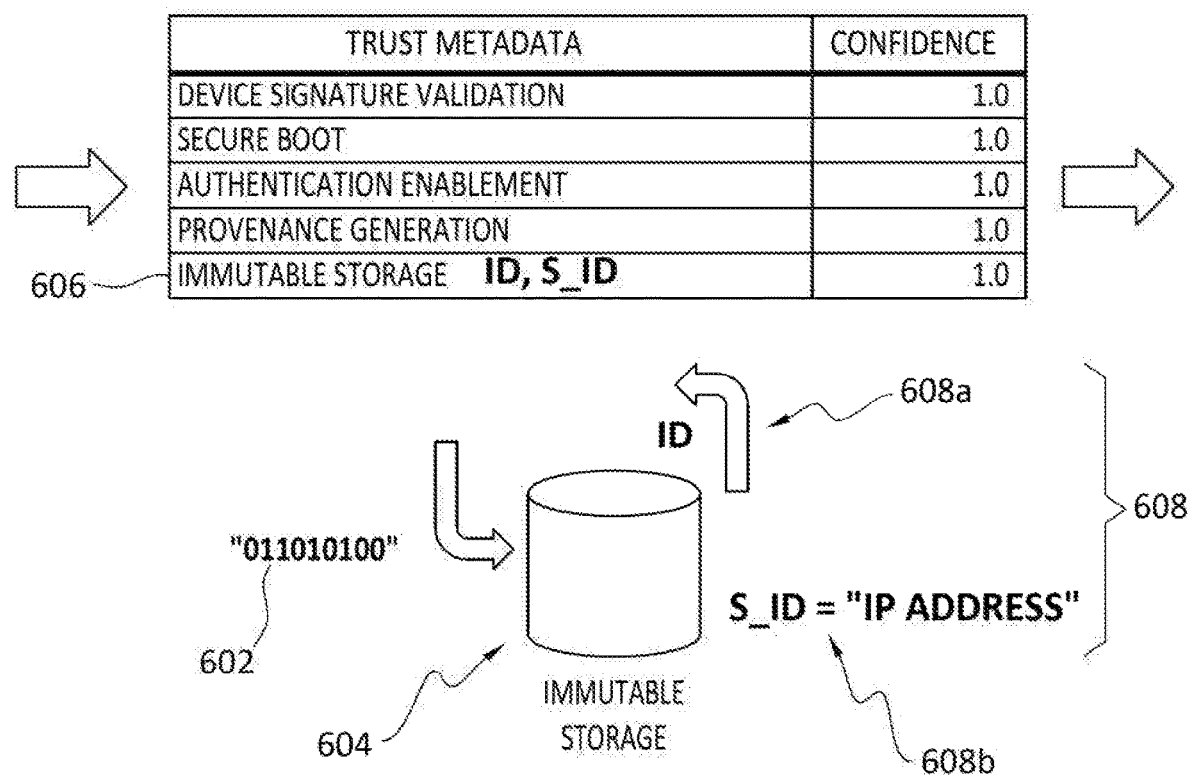
FIG. 6 discloses insertion of an annotation bookmark into a DCF chain.

With continued attention to FIG. 5, and turning now to FIG. 6 as well, further details are provided concerning an example annotation bookmark that may be embedded into DCF metadata. As shown in FIG. 6, data 602, such as a bit stream '011010100' generated by a sensor or other IoT device, may be stored into a confidence-aware data storage system 604, which may comprise an object-based storage system. A trust metadata entry 606 may be created by the confidence-aware data storage system 604. In this example, the trust metadata entry 606 may be named 'Immutable Storage' and have a confidence score of 1.0 assigned by the confidence-aware data storage system 604. The trust metadata entry 606, and associated confidence score of 1.0, thus confirm that the data 602 has been stored in immutable storage.

As further indicated in FIG. 6, the confidence-aware data storage system 604, and/or one or more other entities, may also generate an annotation bookmark 608 that may be associated with the data 602 in the confidence-aware data storage system 604. In the example of FIG. 6, the annotation bookmark 608 may comprise an object ID 608a of the data 602, such as 'ID,' and an identifier 608b, such as 'S_ID,' for the confidence-aware data storage system 604. Additional, or alternative, information may be included in an annotation bookmark, and the object ID 608a and identifier 608b are provided only by way of example. As discussed below in connection with the example of FIG. 7, the elements of the annotation bookmark 608 may be processed, such as by an assessor, one example of which is denoted at 510 in FIG. 5.

Figure 7:
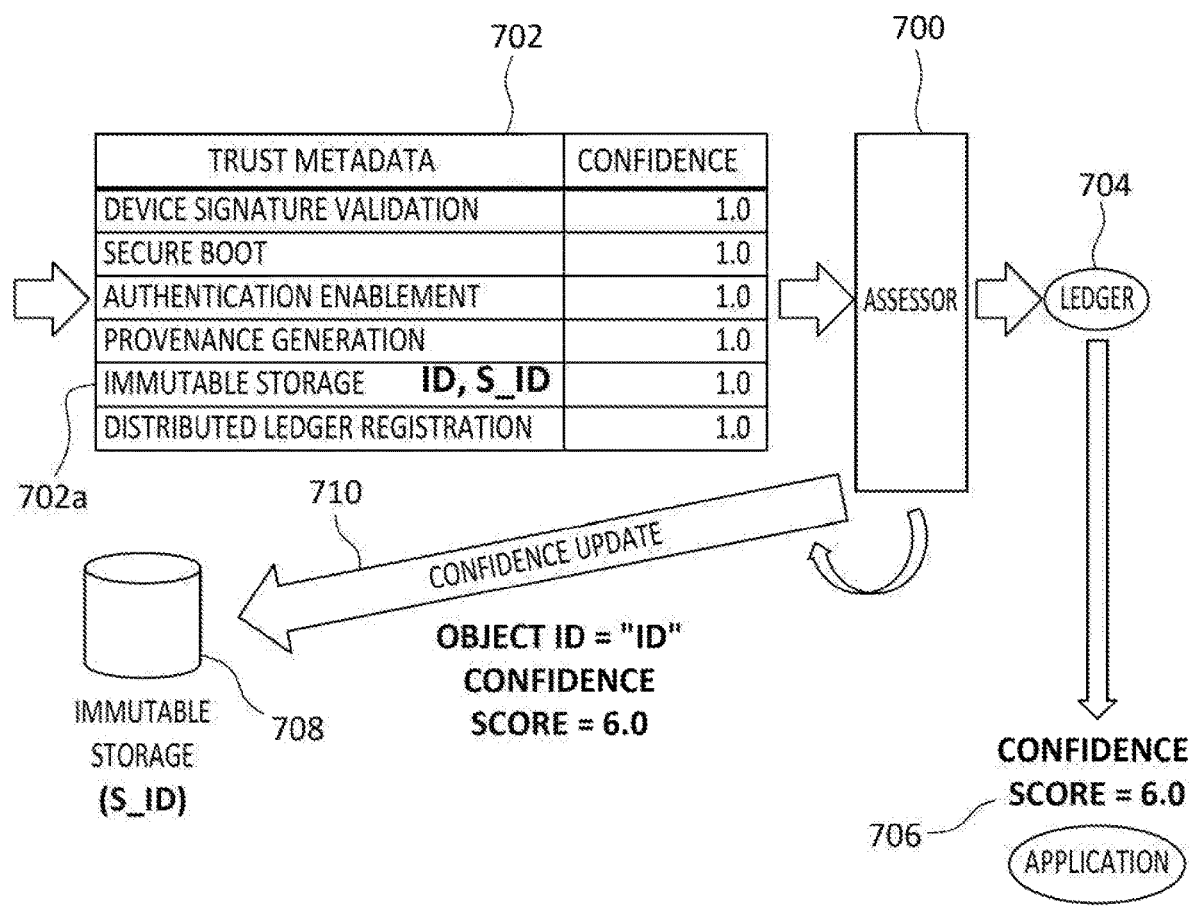
FIG. 7 discloses an update of confidence-aware storage metadata.

As indicated in FIG. 7, an assessor 700 may operate to score DCF metadata, such as trust metadata 702, that is associated with data flowing through the DCF. In some more particular embodiments, the assessor 700 may score the DCF metadatata 702 as that metadata 702 arrives at a specific point in the DCF, such as an endpoint. The score assigned to the DCF metadata 702 by the assessor 700 may be published, for example, to a ledger 704, by the assessor 700 and/or another entity.

As well, the assessor 700 may be configured to search through the rows of a DCF table, for example, to detect the presence of annotation bookmarks, and then execute specific business logic in the context of that bookmark. As an alternative to a table, a non-tabular form of metadata may be employed. As shown in the example of FIG. 7, the assessor 700 may receive DCF metadata 702, which may be in the form of a table for example, and calculate a confidence score 706, such as by summing confidence scores contained in the DCF metadata 702. The assessor 700 may then persist the confidence score 706, and the associated DCF metadata 702, to the ledger 704 where the confidence score 706 and DCF metadata 702 may be stored in association with each other.

In more detail, in some embodiments, the assessor 700 may parse each row in the table of the DCF metadata 702 and search for any annotation bookmark(s) in the table. If the assessor 700 discovers an annotation bookmark, such as the 'Immutable Storage' annotation bookmark 702a that includes the elements 'ID' and 'S_ID,' the assessor 700 may then go back and visit a node in the DCF chain, one example of such a node is the confidence-aware data storage 708, and implement an update operation concerning that node. In the illustrative case where the node is the confidence-aware data storage 708, the assessor may add, or update, as applicable, data confidence information associated with data stored in the confidence-aware data storage 708. More specifically, and with reference to the example of the confidence-aware data storage 708, the assessor 700 may communicate with the confidence-aware data storage 708, using the locator ID S_ID of the confidence-aware data storage 708, and then associate the confidence score, 6.0 in this example, with the data object ID of the data object stored in the confidence-aware data storage 708. In this example then, due to its nature as confidence-aware, the confidence-aware data storage 708 is able to accept a 'Confidence Update' request 710 transmitted by the assessor 700. The assessor 700 and/or the confidence-aware data storage 708 may add/update confidence scores transmitted in connection with a Confidence Update request.

Figure 8:
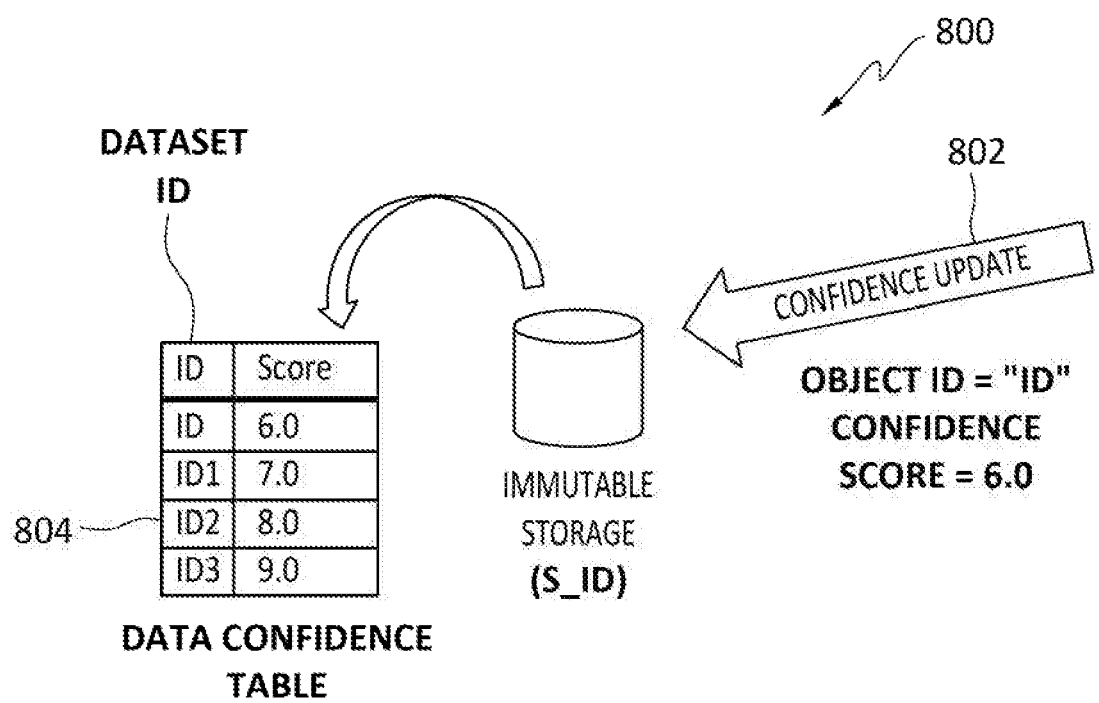
FIG. 8 discloses an embodiment of a storage system configured to accept confidence updates.

With reference next to FIG. 8, further details are provided concerning example interactions that may take place between a confidence-aware data storage system, and an assessor. As disclosed herein, a confidence-aware data storage system 800 may have an awareness that it is participating in the generation of confidence metadata and scores. The confidence-aware data storage system 800 may add annotation bookmarks to DCF metadata, which is associated with data that is, or may be, stored at the confidence-aware data storage system 800 in order to let downstream assessors know that the confidence-aware data storage system 800 would like a confidence update in the future, with respect to data that is, or may be, stored at the confidence-aware data storage system. As such, the confidence-aware data storage system 800 may transmit a Confidence Update request to an assessor, and may associate a confidence score received from the assessor, as part of a Confidence Update 802, with the relevant data set, such as ID, ID1, ID2, or ID3, stored at the confidence-aware data storage system 800. In some embodiments, Confidence Update 802 may be pushed by the assessor to the confidence-aware data storage system, rather than being transmitted by the assessor in response to a request. DCF metadata, such as confidence scores, may be associated with particular datasets by way of a data confidence table 804, although forms of association other than a data confidence table may alternatively be used.

Figure 9:
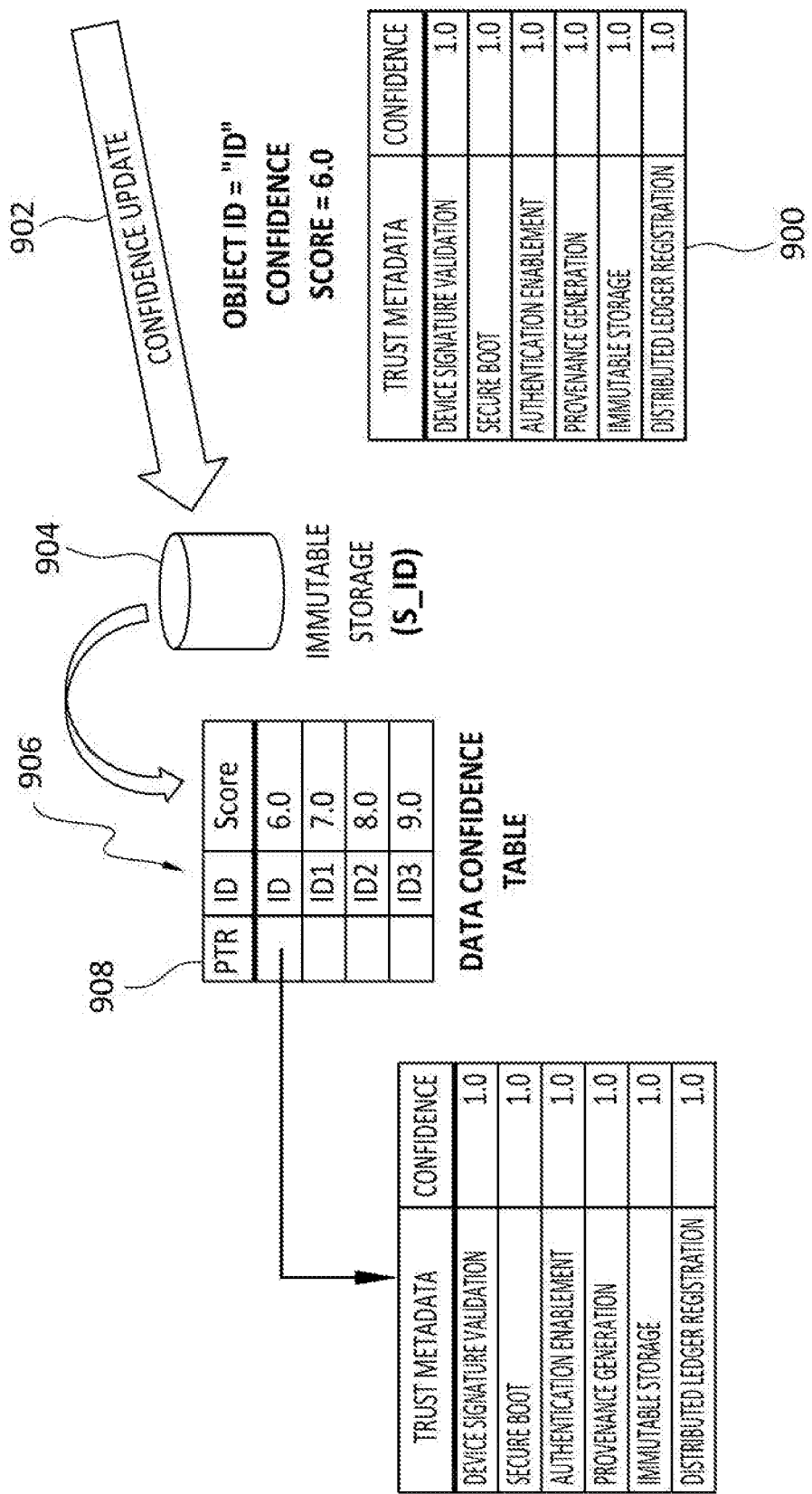
FIG. 9 discloses augmentation of a data confidence table with DCF metadata.

In some embodiments, data confidence scores transmitted by an assessor to data storage such as a confidence-aware data storage system may be augmented with additional confidence metadata. With reference now to FIG. 9, one example arrangement for an augmentation approach is disclosed.

In the example of FIG. 9, rather than sending only the confidence score of 6.0, as in the example of FIG. 8, an assessor may send a entire DCF table 900, as part of a Confidence Update 902, to a confidence-aware data storage system 904. In general, the ability of a storage system to accept and store confidence metadata updates 902, which may include keeping, at the confidence-aware data storage system 904, a table 906 that includes pointers 908 to all confidence metadata residing at the confidence-aware data storage system 904, may enable the confidence-aware data storage system 904 to be 'confidence-aware,' and may enable various additional useful functionalities, some examples of which are addressed hereafter.

By way of illustration, one such functionality concerns confidence reporting for content stored at a confidence-aware storage system. For example, a table such as the table 906 in FIG. 9 may enable a confidence-aware storage system to prepare and transmit reports on the confidence levels of the data stored at the confidence-aware data storage system. Such reports may be requested by, and/or transmitted to, a user such as an administrator, an application, or any computing entity.

To illustrate, an administrator may run a query against a storage system, or open up a graphical user interface for the storage system, and request an 'average confidence score' of one or more datasets stored by the storage system. Using data from a table, such as the table 906 in FIG. 9, a confidence-aware data storage system 904 may be able to report that the average confidence score of data ID, ID1, ID2, and ID3, is 7.5. The report may additionally, or alternatively, specify specific respective scores for individual datasets such as each of data ID, ID1, ID2, and ID3. The reporting of trust metadata such as data confidence scores may be leveraged in a variety of ways. For example, trends such as increasing, or decreasing, data confidence scores may be employed as a basis for implementation of new and/or modified data protection policies. As another example, an increase in data confidence scores, and/or data confidence scores of a particular minimum value, may provide adequate assurance to an application, user, or computing entity, as to the trustworthiness of particular data.

Another functionality that may be associated with some example confidence-aware data storage systems and related processes and entities concerns confidence-lookahead capabilities. For example, by using annotation bookmarks and confidence updates, a storage system may become aware of downstream trust insertion operations, such as a trust insertion process performed, with reference to the example of FIG. 2, by a cloud site that is downstream, in the data flow, of an immutable storage site. This awareness of future trust processing may be analyzed and leveraged in various ways, one of which concerns making routing recommendations. To illustrate, if a storage system sits at an intersection point for multiple data confidence fabrics, such that the storage system is a part or node of multiple DCFs, the storage system may create an annotation which recommends one or more particular DCFs, from among the group of multiple DCFs, tends to produce data with the relatively highest confidence level. This information may be used to examine, and modify, the practices of the lower confidence DCFs with respect to their generation and handling of data. As well, the relatively different confidence levels of the different DCFs may serve as an influence on routing software to change the flow of data through a DCF whose confidence scores may be an area of concern. As a further example, the granularity of trust insertion may be increased, such as by adding more trust evaluating/inserting computing elements in a data flow path, in a DCF with relatively lower confidence scores so as to enable the possible identification of the precise location(s) and/or time(s), for example, where confidence problems are arising in that DCF.

A final example of functionality that may be associated with some example confidence-aware data storage systems and related processes and entities concerns forward lineage associated with data. In particular, the forward lineage of the data, that is, how the data was processed in a DCF after having been stored, may now be bound to the data itself. See, for example, the configuration of FIG. 2 in which the data 203 is copied to immutable storage 204, but still subjected to further processing downstream, for example, by a cloud storage site 209. Confidence scores related to that downstream processing may then be bound to the data in the immutable storage 204 by way of a confidence update transmitted to the immutable storage 204 by an assessor. This information concerning downstream processing may prove useful in audits and other forensic operations since it provides insights as to how particular data was handled after being copied to storage.

D. Example Methods

Figure 10:
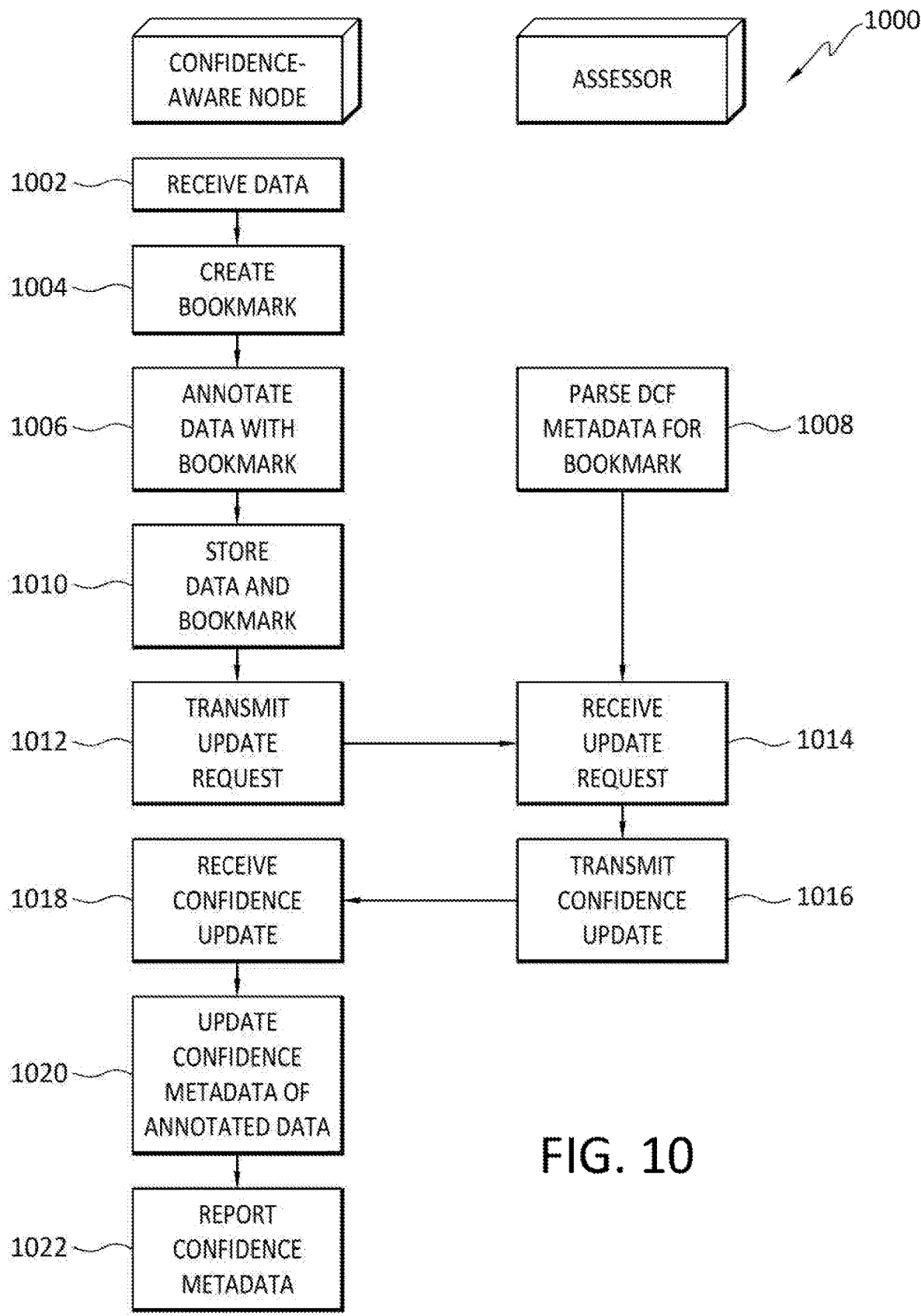
FIG. 10 is a flow diagram that discloses aspects of an example method

It is noted with respect to the example method of FIG. 10 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 10, details are provided concerning methods for annotation bookmarking and related operations, one example of which is denoted generally at 1000. Part or all of the method 1000 may be performed by a storage system or storage site, although that is not necessarily required and, in other embodiments, part or all of the method 1000 may be performed by other entities including, but not limited to, an assessor for example. As well, the various constituent processes or actions of the method 1000 may be performed in the order indicated in FIG. 10, although that is not necessarily required in all cases and the order of various processes may be different from what is shown in FIG. 10. As well, other embodiments may omit one or more processes of FIG. 10 and/or include additional processes not specifically shown in FIG. 10. Thus, method 1000 is provided only by way of example, and is not intended to limit the scope of the invention in any way.

The example method 1000 may begin when a node of a DCF, such as a storage site for example, receives a data stream 1002 from one or more devices in the DCF that are upstream of the node. One or more of those devices may have already assigned trust metadata to that data, although that is not necessarily the case.

After receipt of the data 1002, the node may then create an annotation bookmark 1004, which may also be referred to herein simply as a 'bookmark.' The annotation bookmark may include an identifier that identifies the node, and may also include an identifier for the data that was received 1002. Additional or alternative information may be included in a bookmark. After creation of the annotation bookmark 1004, the bookmark may then be associated with the data 1006. Note that multiple bookmarks may be assigned to a data stream. Where multiple bookmark are assigned, they may all be assigned by a single node, or may be assigned by multiple nodes. That is, in the latter case, each node of a group of nodes may assign one or more bookmarks to a data stream.

The bookmark with which the data has been annotated 1006 may be included with trust metadata previously assigned by other nodes in the DCF. The trust metadata and bookmark may be part of a table that is updated by each node as the data passes through that node. Ultimately, after all the levels of the DCF, or a specified group of one or more levels, have been traversed by the data and associated trust metadata, the trust metadata and bookmark(s), which may collectively comprise DCF metadata, may be received, such as in table form for example, by an assessor entity.

The assessor may parse 1008 the DCF metadata for any bookmark(s) that may be present. This parsing 1008 may take place at any time after the DCF metadata has been received by the assessor and need not be performed at any particular time relative to operations of the node, except that parsing should be performed after the data has been annotated 1006 with the bookmark. In general, the parsing 1008 may enable the assessor to determine (i) whether the storage site is confidence-enabled, and if so, (ii) whether there is data stored at the storage site that may need to be updated with trust metadata that was associated with the data downstream of the storage site. That is, identification of an annotation bookmark during the parsing process 1008 may notify the assessor both that the storage site is confidence enabled, and that there is data at the storage site that may require a confidence update.

Returning now to the method 1000, after the data has been annotated 1006, the data may be stored 1010 in association with the bookmark(s) at, and by, the node. At some point after this storage, the node may transmit an update request 1012 concerning the data. An update may be needed since nodes downstream of the annotating node may have added trust metadata to the data, and the annotating node may not be aware of the additional trust metadata, or of confidence scores associated with that additional trust metadata. The update request may be received 1014 by the assessor, and any trust metadata updates, such as additional confidence metadata and scores, may be transmitted 1016 by the assessor to the node. In some cases, the update request 1012 may be omitted, and the assessor may simply transmit 1016, on its own initiative, the confidence update to the node.

The method 1000 may next proceed to 1018 where the confidence-aware node may receive the confidence update from the assessor. The confidence update may take various forms such as, for example, a single confidence score, or a group of confidence scores. No particular form of a confidence update is required. After receipt of the confidence update 1018, the confidence-aware node may then update 1020 the stored confidence information, associated with the data that was annotated with the bookmark at 1006, with the information in the confidence update.

Finally, a report may be generated 1022 concerning trust metadata, such as confidence scores, that are associated with data stored at the storage site. The report may be generated 1022 automatically after an update has been completed. As another example, a report may be generated 1022 on a regular periodic basis. As a further example, a report may be generated 1022 ad hoc at any time in response to a query by a user or computing entity. The report may show, for example, the current version of trust metadata associated with a dataset, and/or an update history for that trust metadata. More generally, a report may include any information, data, and/or metadata, concerning data stored at the storage site.

E. Further Example Embodiments

Following are some further example embodiments of the invention. These are presented only by way of example and are not intended to limit the scope of the invention in any way.

Embodiment 1. A method, comprising: receiving data from a node of a data confidence fabric; in response to receipt of the data, creating an annotation bookmark that (i) identifies a storage node at which the data was received and that (ii) uniquely identifies the data; annotating a copy of the data with the annotation bookmark; and storing, at the storage node, the copy of the data in association with the annotation bookmark.

Embodiment 2. The method as recited in embodiment 1, further comprising adding the annotation bookmark to trust metadata associated with data.

Embodiment 3. The method as recited in embodiment 2, wherein the trust metadata was associated with the data prior to adding the annotation bookmark to the trust metadata.

Embodiment 4. The method as recited in any of embodiments 2-3, further comprising receiving a confidence update, and updating the trust metadata with confidence information of the confidence update.

Embodiment 5. The method as recited in any of embodiments 2-4, further comprising generating a report that comprises the trust metadata and the annotation bookmark.

Embodiment 6. The method as recited in any of embodiments 2-5, wherein the confidence update is received from an assessor as a result of parsing, by the assessor, of metadata that includes the trust metadata.

Embodiment 7. The method as recited in any of embodiments 1-6, wherein the trust metadata comprises a confidence score that was assigned to the data by a node upstream of the storage node in the data confidence fabric.

Embodiment 8. The method as recited in any of embodiments 1-7, further comprising passing the data to a node downstream of the storage node in the data confidence fabric.

Embodiment 9. The method as recited in any of embodiments 1-8, wherein some of the data was generated by a sensor.

Embodiment 10. The method as recited in any of embodiments 1-9, wherein the annotation bookmark comprises a notification to an assessor that the storage node is enabled to receive and process trust metadata associated with the data.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 11:
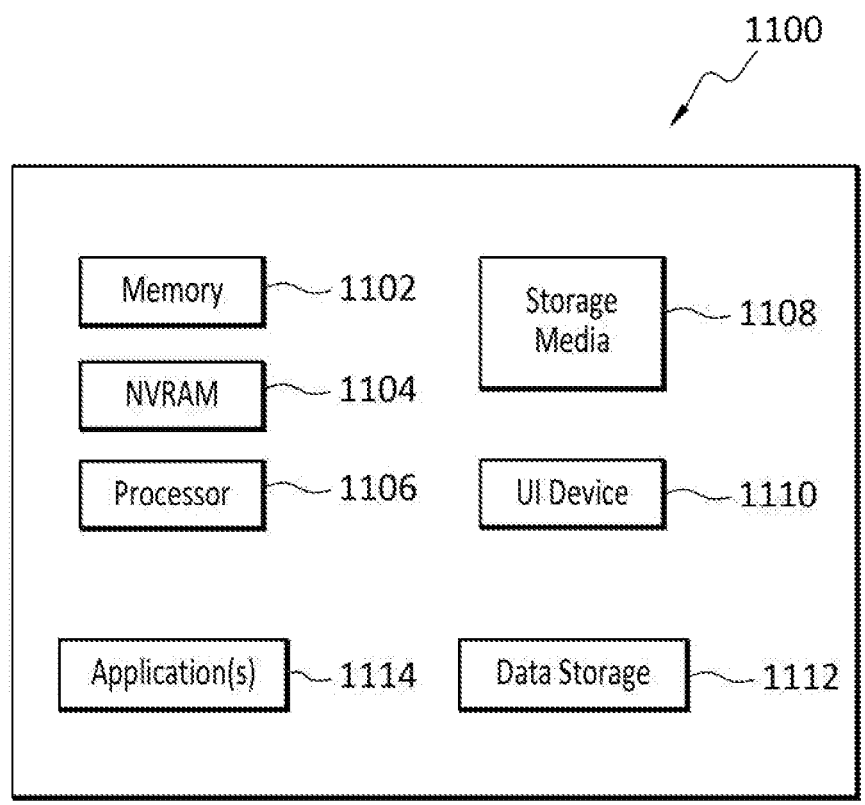
FIG. 11 discloses aspects of an example computing entity.

With reference briefly now to FIG. 11, any one or more of the entities disclosed, or implied, by FIGS. 1-10 and/or elsewhere herein, may take the form of, or include, or be implemented on, or hosted by, a physical computing device, one example of which is denoted at 1100. As well, where any of the aforementioned elements comprise or consist of a virtual machine (VM), that VM may constitute a virtualization of any combination of the physical components disclosed in FIG. 11.

In the example of FIG. 11, the physical computing device 1100 includes a memory 1102 which may include one, some, or all, of random access memory (RAM), non-volatile memory (NVM) 1104 such as NVRAM for example, read-only memory (ROM), and persistent memory, one or more hardware processors 1106, non-transitory storage media 1108, UI device 1110, and data storage 1112. One or more of the memory components 1102 of the physical computing device 1100 may take the form of solid state device (SSD) storage. As well, one or more applications 1114 may be provided that comprise instructions executable by one or more hardware processors 1102 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving, by a server, data from a node of a data confidence fabric;
   in response to receipt of the data, creating, by the server, an annotation bookmark that (i) identifies a storage node at which the data is stored and that (ii) uniquely identifies the data;
   adding, by the server, the annotation bookmark to trust metadata assigned to the data; and
   storing, at the storage node, a copy of the data in association with a data confidence table including a list of data confidence scores of the data,
   wherein, when the metadata is updated by a node downstream of the storage node in the data confidence fabric, the list of data confidence scores is correspondingly updated and saved in the storage node based on the annotation bookmark.

2. The method as recited in claim 1, wherein the trust metadata was associated with the data prior to adding the annotation bookmark to the trust metadata.

3. The method as recited in claim 1, further comprising:
   receiving, by an assessor, a confidence update; and
   updating, by the assessor, the trust metadata with confidence information of the confidence update.

4. The method as recited in claim 1, further comprising generating, by the server, a report that comprises the trust metadata and the annotation bookmark.

5. The method as recited in claim 3, wherein the confidence update is received from an assessor as a result of parsing, by the assessor, of metadata that includes the trust metadata.

6. The method as recited in claim 1, wherein the trust metadata comprises a confidence score that was assigned to the data by a node upstream of the storage node in the data confidence fabric.

7. The method as recited in claim 1, further comprising passing the data to the node downstream of the storage node in the data confidence fabric.

8. The method as recited in claim 1, wherein some of the data was generated by a sensor.

9. The method as recited in claim 1, wherein the annotation bookmark comprises a notification to an assessor that the storage node is enabled to receive and process trust metadata associated with the data.

10. A non-transitory storage medium having stored therein instructions that are executable by one or more hardware processors to perform operations comprising:
    receiving, by a server, data from a node of a data confidence fabric;
    in response to receipt of the data, creating, by the server, an annotation bookmark that (i) identifies a storage node at which the data is stored and that (ii) uniquely identifies the data;
    adding, by the server, the annotation bookmark to trust metadata assigned to the data; and
    storing, at the storage node, a copy of the data in association with a data confidence table including a list of data confidence scores of the data,
    wherein, when the metadata is updated by a node downstream of the storage node in the data confidence fabric, the list of data confidence scores is correspondingly updated and saved in the storage node based on the annotation bookmark.

11. The non-transitory storage medium as recited in claim 10, wherein the trust metadata was associated with the data prior to adding the annotation bookmark to the trust metadata.

12. The non-transitory storage medium as recited in claim 10, further comprising:
    receiving, by an assessor, a confidence update; and
    updating, by the assessor, the trust metadata with confidence information of the confidence update.

13. The non-transitory storage medium as recited in claim 10, further comprising generating, by the server, a report that comprises the trust metadata and the annotation bookmark.

14. The non-transitory storage medium as recited in claim 12, wherein the confidence update is received from an assessor as a result of parsing, by the assessor, of metadata that includes the trust metadata.

15. The non-transitory storage medium as recited in claim 10, wherein the trust metadata comprises a confidence score that was assigned to the data by a node upstream of the storage node in the data confidence fabric.

16. The non-transitory storage medium as recited in claim 10, further comprising passing the data to the node downstream of the storage node in the data confidence fabric.

17. The non-transitory storage medium as recited in claim 10, wherein some of the data was generated by a sensor.

18. The non-transitory storage medium as recited in claim 10, wherein the annotation bookmark comprises a notification to an assessor that the storage node is enabled to receive and process trust metadata associated with the data.

* * * * *